United States Patent
Bradley

(10) Patent No.: US 10,064,331 B2
(45) Date of Patent: Sep. 4, 2018

(54) MECHANICAL WEED SEED MANAGEMENT SYSTEM

(71) Applicants: BAIL & BURNIT PTY LTD, Bolgart (AU); HRT INVESTORS PTY LTD, Bolgart (AU)

(72) Inventor: Phillip Bradley, Bolgart (AU)

(73) Assignees: Bail & Burnit Pty Ltd, Bolgart (AU); HRT Investors Pty Ltd, Bolgart (AU)

(*) Notice: Subject to any disclaimer, the term of this patent is extended or adjusted under 35 U.S.C. 154(b) by 0 days.

(21) Appl. No.: 15/502,735

(22) PCT Filed: Nov. 20, 2015

(86) PCT No.: PCT/AU2015/000703
§ 371 (c)(1),
(2) Date: Feb. 8, 2017

(87) PCT Pub. No.: WO2016/201482
PCT Pub. Date: Dec. 22, 2016

(65) Prior Publication Data
US 2018/0084717 A1  Mar. 29, 2018

(30) Foreign Application Priority Data
Jun. 18, 2015  (AU) ................................ 2015902339

(51) Int. Cl.
*A01D 41/12* (2006.01)
(52) U.S. Cl.
CPC ............................... *A01D 41/1243* (2013.01)

(58) Field of Classification Search
CPC ........................... A01D 41/1243; A01F 12/40
See application file for complete search history.

(56) References Cited

U.S. PATENT DOCUMENTS 3,276,451 A   10/1966  Donogh
3,860,010 A    1/1975  Anderson et al.
(Continued)

FOREIGN PATENT DOCUMENTS

| DE | 3325951 A1 | 1/1985 | |
|---|---|---|---|
| WO | WO95/15077 A1 | 6/1995 | |
| WO | WO-9515077 A1 * | 6/1995 | ......... A01D 41/1243 |

OTHER PUBLICATIONS

International Preliminary Report on Patentability issued in PCT/AU2015/000703 dated Aug. 18, 2016.
(Continued)

*Primary Examiner* — Alicia Torres
(74) *Attorney, Agent, or Firm* — Hoffmann & Baron, LLP

(57) ABSTRACT

The present invention relates to a mechanical weed seed management system and device for use on a harvester. The device comprises a plate to separate straw waste from chaff waste after their discharge from the harvester; a chute to catch, direct, and deposit the straw waste to the ground; and an annular trough comprising a means for transporting material through its length, for catching, transporting, and depositing the chaff waste on top of the straw waste on the ground, wherein the trough is of a depth greater than 150 mm, and wherein the plate directs the straw waste from the harvester to the chute. The system for the management of weeds in farmable land comprises the device.

14 Claims, 6 Drawing Sheets

(56) References Cited

U.S. PATENT DOCUMENTS

| | | | |
|---|---|---|---|
| 4,532,941 A * | 8/1985 | Gauthier | A01F 12/40 241/243 |
| 4,943,260 A | 7/1990 | Fossum | |
| 6,881,145 B2 * | 4/2005 | Holmen | A01D 41/1243 460/112 |
| 2003/0022706 A1 | 1/2003 | McLeod | |
| 2015/0089912 A1 * | 4/2015 | Patton | A01D 57/28 56/10.2 R |

OTHER PUBLICATIONS

Reference D7—AGRIster, CLAAS Mega 204 Specifications, downloaded from http://www.agrister/com/combines/claas-mega-204-94, dated May 27, 2016.

Reference D8—AGRIster, CLAAS Mega 202, 203 & 204 Specifications, downloaded from http://harvestop.eu/browse/Claas/Mega%20200, dated May 27, 2016.

Reference D9—AGRIster, CLAAS Dominator 86 Specifications, downloaded from http://www.agrister.com/combines/claas-dominator-86, dated May 27, 2016.

Reference D10—AGRIster, CLAAS Dominator 76, 86, 96, & 106 Specifications, downloaded from http://www.agrister.com/combines/claas-dominator-76, dated Mar. 8, 2018.

Reference D11—AGRIster, CLAAS Mega 208, 1995 Specifications, downloaded from http://www.mascus.es/agriculture/used-combine-harvesters/claas-mega-208/kpbq5p5t.html?language=EN, dated May 27, 2016.

* cited by examiner

MECHANICAL WEED SEED MANAGEMENT SYSTEM

CROSS-REFERENCE TO RELATED APPLICATIONS

This application is the U.S. National Phase of, and Applicants claim priority from, International Application No. PCT/AU2015/000703, filed 20 Nov. 2015, and Australian Provisional Patent Application No. 2015902339, filed 18 Jun. 2015, both of which are incorporated herein by reference in their entirety.

FIELD OF THE INVENTION

The present invention relates to a mechanical weed seed management system and device for use therewith.

BACKGROUND

Annually, grain farmers are faced with weeds, for example, ryegrass and radish, within their crops. Often, weeds cause huge production losses each harvest. Presently, herbicides are used to attempt to control weeds in techniques such as crop-topping: the late application of herbicides to prevent weed seed-set in crop. Crop-topping may reduce grain contamination, but will not increase yields. Herbicide resistance is also making the use of chemicals to control weeds increasingly ineffective.

Another method of weed control includes careful management of rotation of land use. This involves farming different produce, such as vegetative crop then livestock, on alternative areas of land. Rotation methods may also involve not farming on a particular land area for one or more seasons. Rotation methods can decrease the amount of profitable land available to a farmer in a year and may force the farming of less profitable material on the available land.

Mechanical control of weed seed has also been used by farmers during harvest with the use of attachments to harvesting machinery. When plant material, including grain and unwanted straw and weed material is harvested, the grain is separated from the unwanted waste and collected, while the waste is either spread onto the harvested land or compiled into windrows for burning or baling. Whilst the spreading technique is almost entirely useless for weed control, the windrows can be somewhat effective.

Burning windrows has the ability to destroy weed seeds but only if the temperature of the burn is high enough. If seeds are dropped to the earth from the harvester and an unacceptable amount of straw and other material covers the seed, the seeds are insulated somewhat from the burn and remain viable. Conversely, baling collects the dropped waste material and compiles it into bales for removal from the area and use as livestock feed, for example. However, if the ryegrass levels in the crop were significant, the baled material will have an unacceptable level of annual ryegrass toxicity (ARGT) for direct straw export. Rather, the bales may only be used for pellet production.

An existing accessory for a harvester, known as a chaff top, transports the chaff fraction of the waste material, which contains the greatest portion of weed seed, to be placed on top of the straw fraction within a windrow. Accordingly, effective burning can be achieved and seeds are rendered unviable. However, these accessories have been rarely used as they have been found to prevent the smooth flow of material through the harvester and cause frequent blockages.

The present invention attempts to overcome at least in part the aforementioned disadvantages of previous mechanical weed seed management systems and devices.

SUMMARY OF THE INVENTION

In accordance with one aspect of the present invention there is provided a mechanical weed seed management device for use on a harvester, the device comprising:
a plate to separate straw waste from chaff waste after their discharge from the harvester;
a chute to catch, direct, and deposit the straw waste to the ground; and
an annular trough comprising a means for transporting material through its length, for catching, transporting, and depositing the chaff waste on top of the straw waste on the ground, wherein the trough is of a depth greater than 150 mm, and wherein the plate directs the straw waste from the harvester to the chute.

The trough may be of a depth of 310 mm.

The trough may be of a width of between 250 mm and 450 mm.

The trough may be of a width of between 275 mm and 290 mm.

The trough may be generally triangular with rounded corners in shape.

The device may further comprise at least one guard abutting a section of the trough for assisting in guiding the chaff waste into the trough.

The at least one guard may be disposed at one or more of: forward of the trough; within a middle area of the annular trough, forward of the chute; and above an unroofed length of the trough, at respective sides of the device.

The chute may be tapered inwardly downwards for directing the straw into a narrower deposit.

The width of the chute may be variable for a variable width deposit of straw waste on the ground.

The trough may be square shaped in sectional profile.

The means for transporting material through the length of the trough may comprise a paddled chain.

Each paddle may be dimensioned so as to be of a complementary size and shape to the trough.

The device may be powered by a hydraulic pump.

The device may further comprise a monitoring means for monitoring operation of the device and/or alerting a user if the operation is interrupted.

In accordance with another aspect of the present invention, there is provided a mechanical weed seed management system for the management of weeds in farmable land, the system comprising the weed seed management device.

The waste on the ground may be removed by burning or bailing.

BRIEF DESCRIPTION OF DRAWINGS

The present invention will now be described, by way of example, with reference to the accompanying drawings, in which.

DESCRIPTION OF PREFERRED EMBODIMENTS

Referring to the Figures, there is shown a device 10 of a mechanical weed seed management system for use with and upon a harvester 12. The device 10 is mounted upon the harvester 12 so as to catch and process waste material, such as weed and straw, from the harvesting process. Accordingly, the device 10 is generally mounted toward the rear of the harvester 12.

Figure 3:
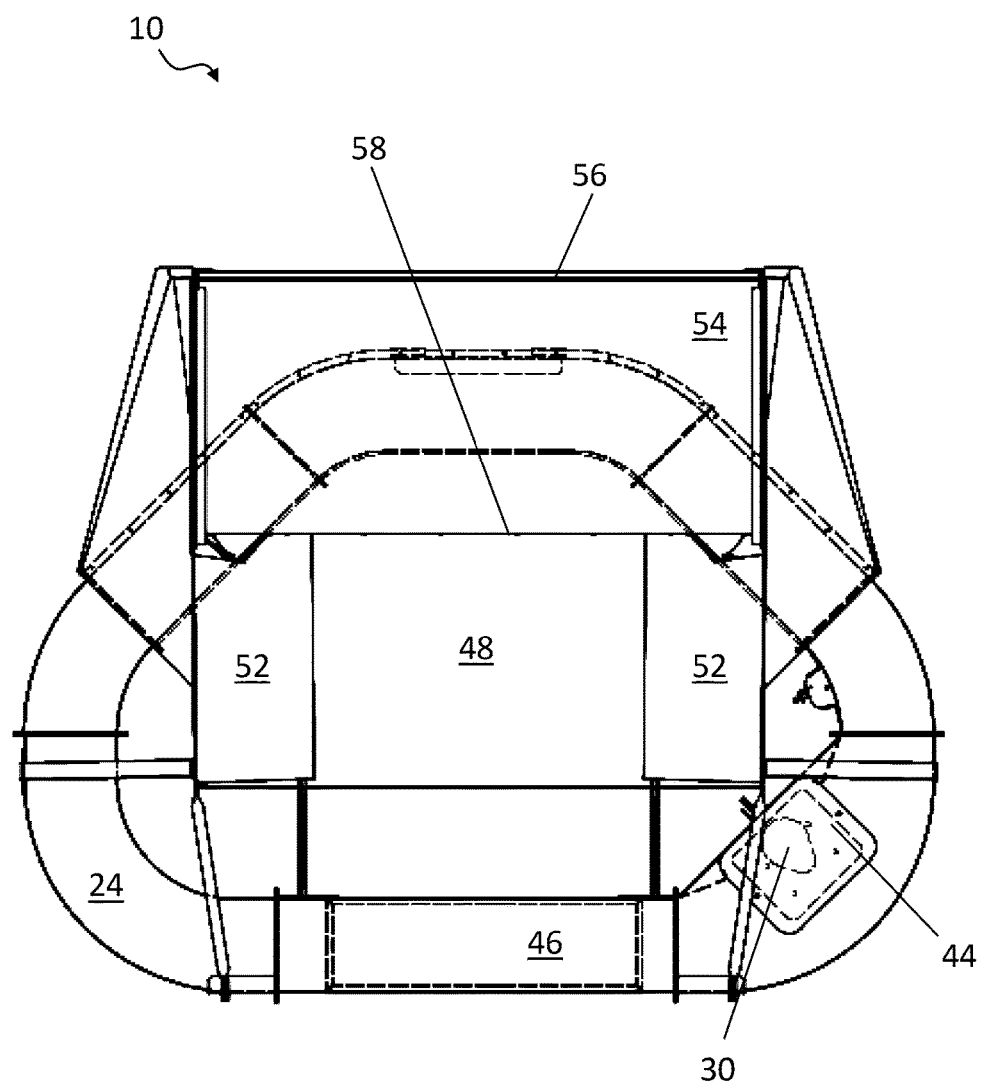
FIG. 3 is an upper plan view of the device of FIG. 1.

The trough 24 of the device 10 is annular and generally rounded-triangular in shape (as best seen in FIG. 3), encircling the back of the harvester 12 and reaching to an underside of the harvester 12. The trough 24 comprises at least three walls defining a volume therein of a depth greater than 150 mm, preferably about 310 mm deep. The width of the trough is between about 250 mm and 450 mm, preferably between 275 mm and 290 mm. Within the trough 24 is disposed a chain 26 comprising paddles 28 spaced apart on links of the chain 26. The height of each paddle 28 is complementary to the depth of the trough 24; similarly, the length of each paddle 28 is complementary to the width of the trough 24. Preferably, the chain 26 further comprises at least one adjustment link for adjusting the tension of the chain 26.

It is preferred that the cross-sectional profile of the trough 24 is square. However, other shaped profiles are contemplated, including but not limited to generally square with rounded corners, or half-circular, with a rounded base. In the case of a half-circular profile, the paddles may be complementary shaped, for example be formed as half-moons.

Figure 1:
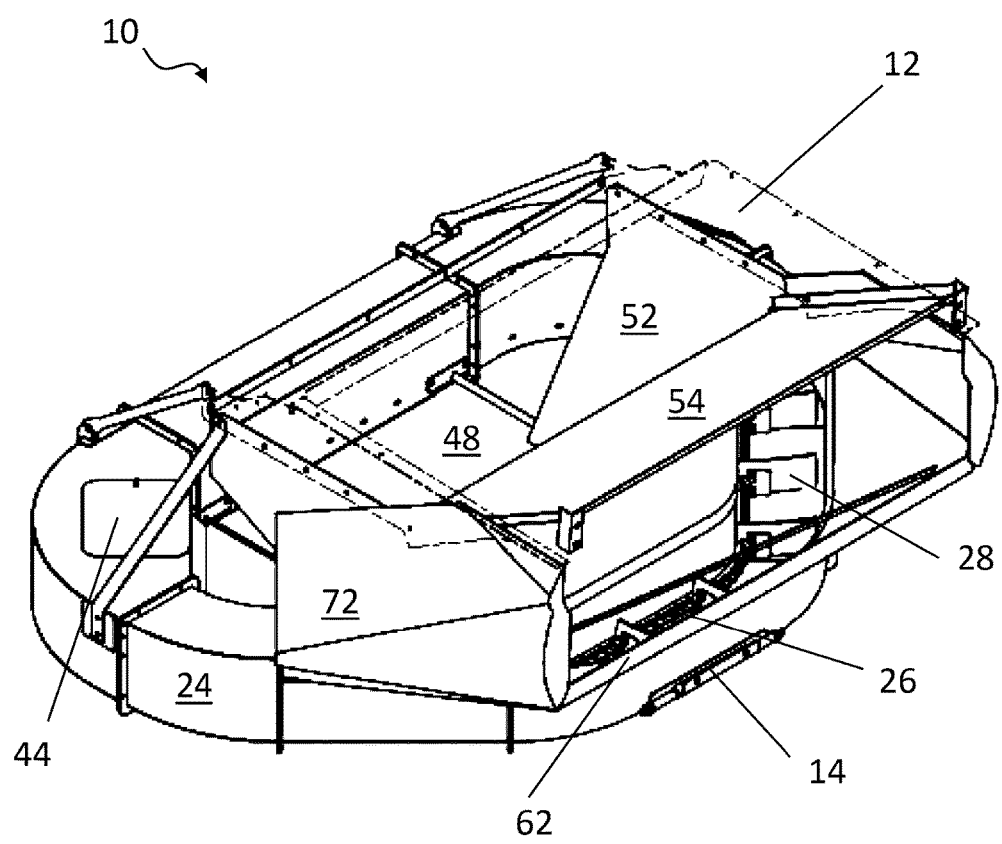
FIG. 1 is an upper front perspective view of a device of a mechanical weed seed management system according to the present invention.
Figure 2:
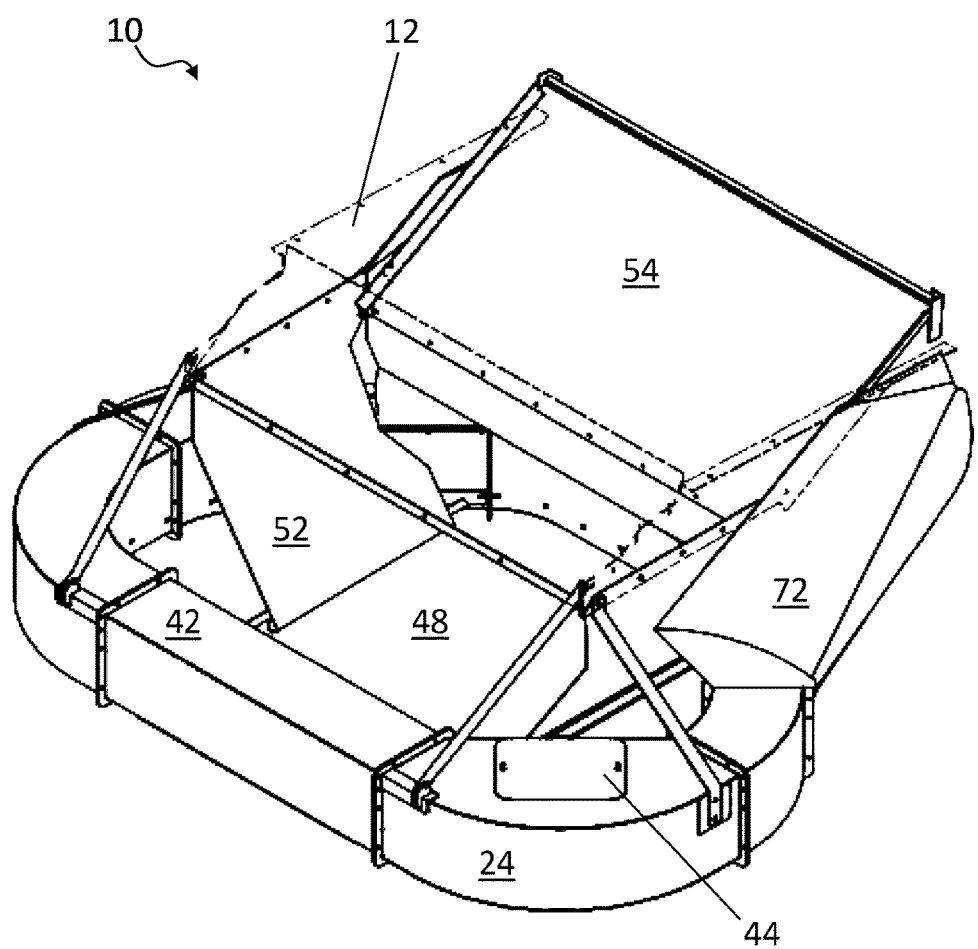
FIG. 2 is an upper rear perspective view of the device of FIG. 1.

The chain 26 is in connection with a drive cog 30, which is, according to a preferred embodiment, driven by a hydraulic pump 32 in a usual manner as would be understood by the skilled person. The pump 32 is located at an underside of the trough 24, as best seen in FIG. 2. In accordance with a preferred embodiment of the present invention, the chain 26 is driven to move in an anticlockwise direction through the volume defined within the trough 24. It is envisioned that the device 10 is equally as capable of operating with the chain 26 being driven to move in a clockwise direction.

The device 10 may optionally further comprise a camera and other monitoring equipment such as alarms. The monitoring equipment may be in connection with the cog 30 or chain 26 such that if either integer ceased normal operation, a user would be alerted visually or audibly.

Approximately half the length of the trough 24, positioned toward the rear of the device 10 where it exits from the harvester 12, comprises a roof 42 which acts to completely enclose the volume defined within the trough 24. The roof 42 comprises an access panel 44 removable from the roof 42. The access panel 44 is aligned with and located generally above the drive cog 30 for ease of access to the interior of the trough 24, chain 26, and drive cog 30.

Within a floor of the trough 24 is disposed a chaff vent 46 for material within the trough 24 to fall through under gravity. According to a preferred embodiment of the present invention, the chaff vent 46 comprises a generally rectangular cut-out piece from the central rear floor of the trough 24.

Located generally encircled by the trough 24 is a straw chute 48. The straw chute comprises two side walls 52 angled to create a downward taper to the straw chute 48. The straw chute 48 is open at both its upper and lower ends to allow material to fall through the chute 48 under gravity, and also to be selectively directed to fall into a narrower width by the taper of the straw chute 48. The width of the chute 48 can be varied according to a user's preference or to better suit the crop being harvested.

Disposed generally above and forward of the straw chute 48 is a plate 54. The forward end 56 of the plate 54 is substantially adjoining the floor of the compartment of the harvester 12 from where straw waste 68 is disposed. The plate 54 extends from its forward end 56 to its back end 58, which is located substantially over the upper end of the straw chute 48. Accordingly, the plate 54 acts, in use, to direct straw waste 68 from the harvester 12 into the straw chute 48.

Optionally, the device 10 may further comprise a front guard 62. The front guard 62 extends forward from the upper edge of the front wall of the trough 24 to the underside of the compartment of the harvester 12 from where chaff, weed seeds and other fine waste material 70 (hereinafter called "chaff" for ease of description) is discharged. Accordingly, the front guard 62 acts, in use, to direct chaff 70 from the harvester 12 into the trough 24. The action of the front guard 62 may be further assisted by a front flap (not shown), preferably comprising a flexible sheet suspended from an underside of the harvester 12 to rest upon the front guard 62.

A rear guard (not shown) may also be provided on the device 10. The rear guard generally encloses the central hole created by the annular shape of the trough 24, forward of the chute 48. Hence, the rear guard extends upwards from the upper edge of the rear wall of the trough 24 to the underside of the plate 54. To each side, the rear guard extends along the majority of the unroofed portion of the trough 24. Accordingly, very little material entering from the harvester 12 to the trough 24 area is allowed escape except into the trough 24.

Figure 4:
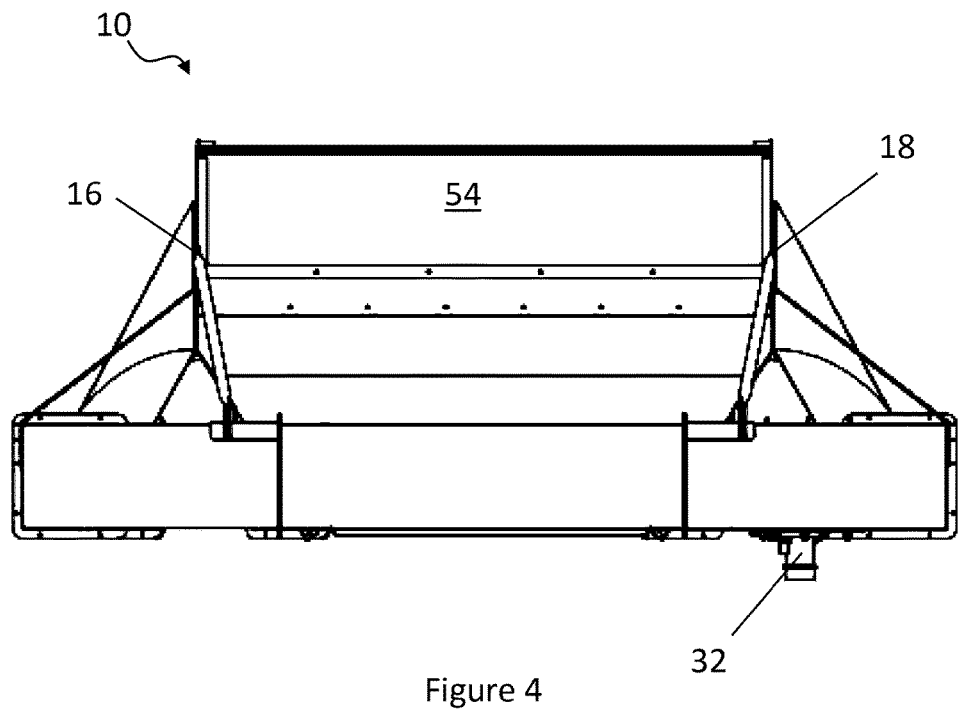
FIG. 4 is a rear plan view of the device of FIG. 1.
Figure 5:
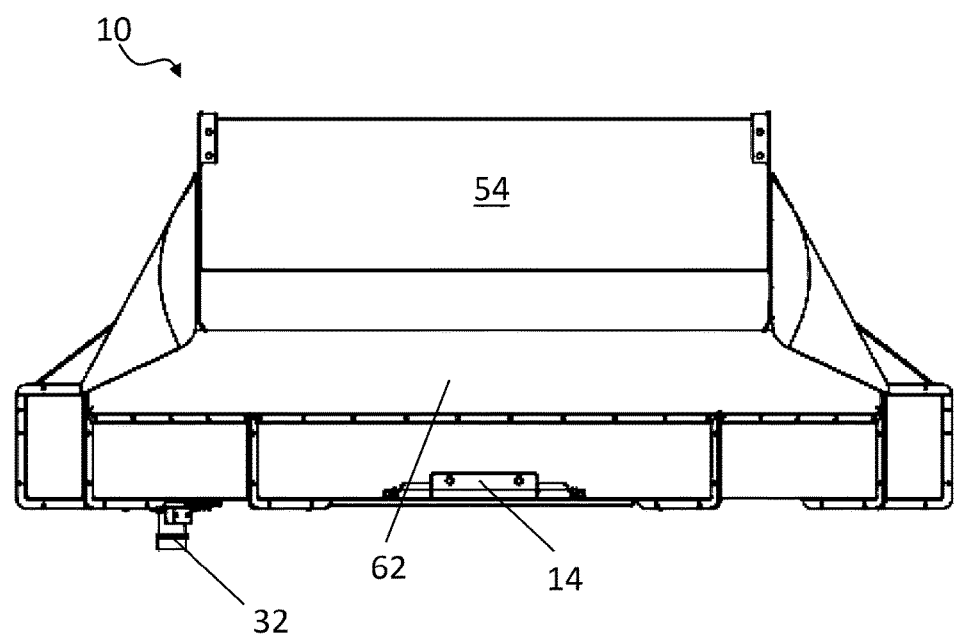
FIG. 5 is a front plan view of the device of FIG. 1.
Figure 6:
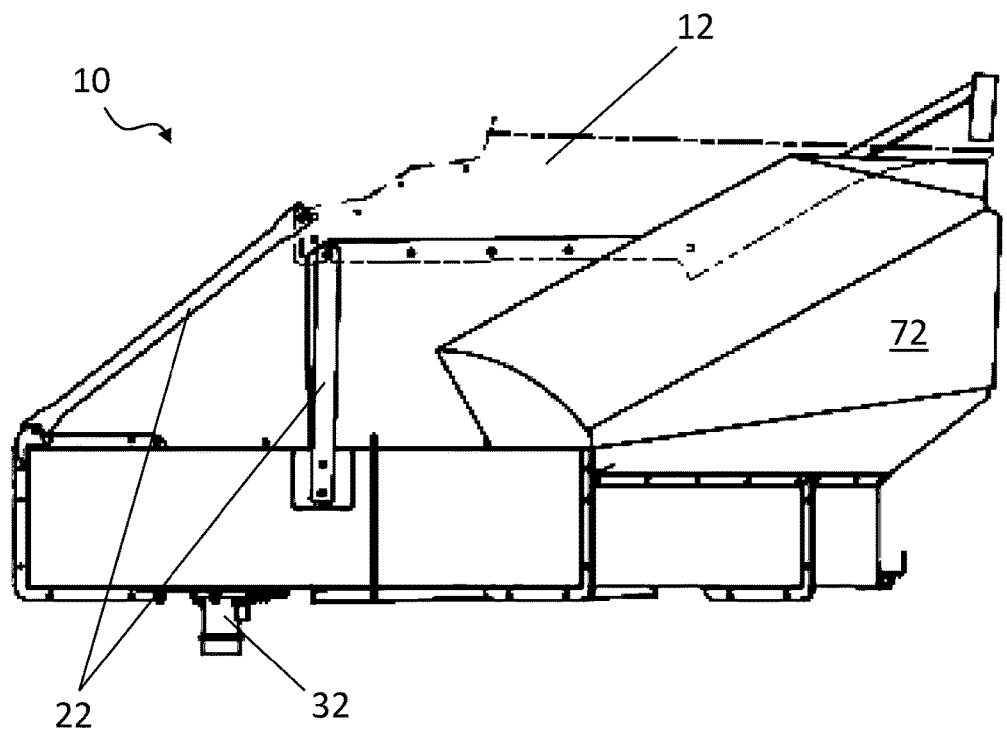
FIG. 6 is a side plan view of the device of FIG. 1.
Figure 7:
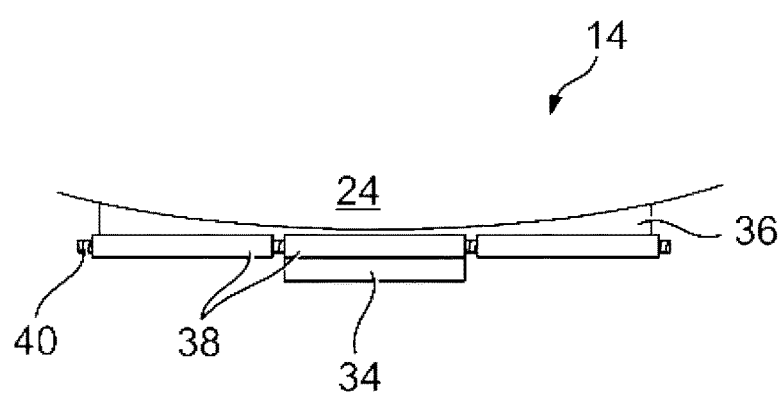
FIG. 7 is a top schematic view of a first point of attachment 14 of the device of FIG. 1.
Figure 8:
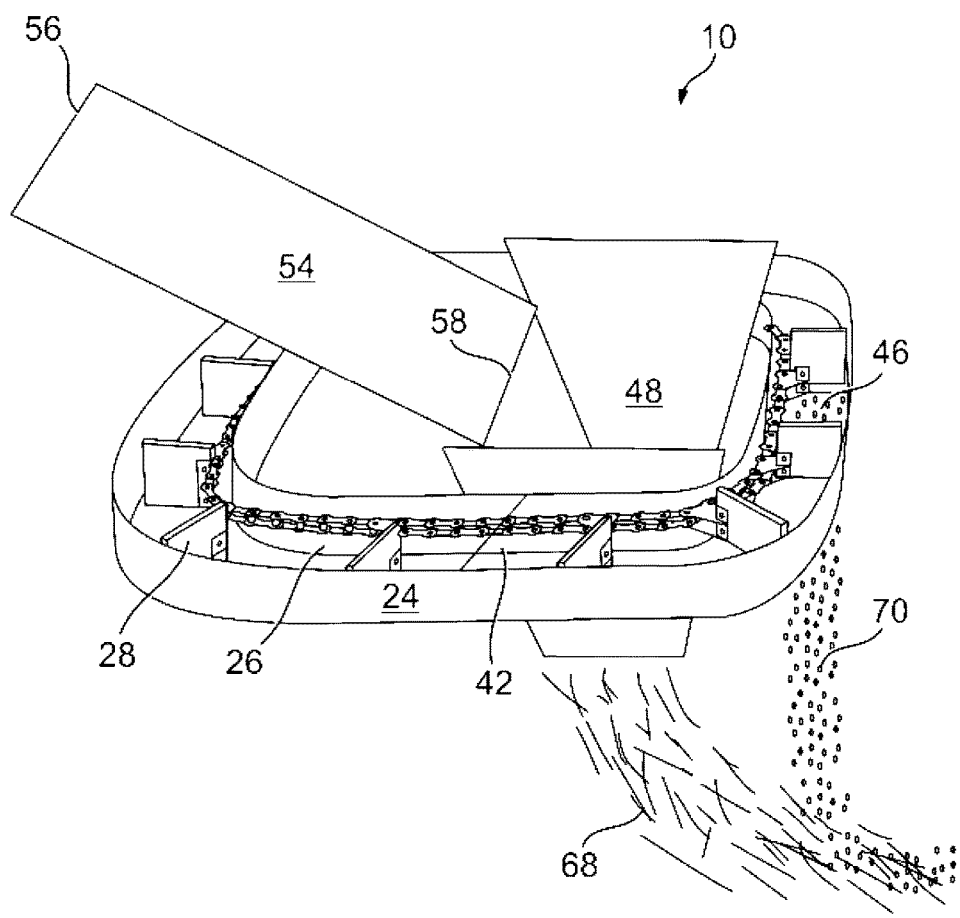
FIG. 8 is a perspective schematic view of the device of FIG. 1.

The device 10 may be provided with left and right side guards 72, as best seen in FIG. 4. Each side guard 72 is disposed on a respective side of the device 10, curved above the trough 24 forward of the roofed portion of the trough 24. The lower, outer edge of each side guard 72 abuts the front guard 62, and the upper, inner edge of each side guard 72 abuts the harvester 12 so as to further enclose the unroofed portion of the trough 24. The rear end of each side guard 72, proximal to the forward roofed portion of the trough 24, is truncated so as to allow dust, for example, to escape from the guarded areas of the device 10. It has been advantageously found that the curved, open shape of the optional side guards 72 act to direct dust out of unwanted areas and downwards to the ground and away from the device 10. In addition, the reduction in circulating dust provided by the side guards 72 and the effectiveness of the device 10 generally, render the device 10 and harvester 12 combination capable of operating at 50 tons of wheat or 15-18 tons of canola per hour while further processing waste 68, 70 from the harvester 12. The device 10 is operable on a class 9 header, functioning at its maximum capability, without blockages or disruptions.

It is preferred that the guards 62, 72 and rear guard are constructed of a moulded plastic. Alternatively, the guards 62, 72 and rear guard may be constructed of a flexible plastic so that they assume their preferable shape once in place on the device 10. It is preferred that the guards 62, 72 and rear guard are in connection with the device 10 and/or harvester 12 using magnetism. However, other suitable means for attachment of the guards 62, 72 and rear guard may also be used, including but not limited to, rivets, studs, or latches.

With particular reference to FIGS. 4 to 7 and in accordance with a preferred embodiment, the device 10 comprises first 14, second 16, and third 18 points of attachment. The first point of attachment 14 connects the device 10 to the rear axle of the harvester 12 and preferably comprises an axle bracket 34 for mounting onto the axle and a trough bracket 36 for mounting onto a trough 24 of the device 10 in any suitable manner as known. Both the brackets 34, 36 comprise at least one stud receiver 38 through which, aligned, a stud 40 can pass to complete attachment at the first point of attachment 14.

The second 16 and third 18 points of attachment may comprise at least one strap 22 each, connecting the trough 24 to suitable locations near the rear of a respective side of the harvester 12.

In use, the weed seed management device 10 is attached to the rear of the harvester 12 in such a way so as to further process the waste material exiting the harvester 12. The device 10 is attached to the harvester 12 at the first 14, second 16, and third 18 points of attachment. As would be clear to the skilled person, the stud receivers 38, of both the axle bracket 34 and trough bracket 36 of the first point of attachment 14, are aligned for the passage of the stud 40 and hence attachment of the device 10 to the rear axle of the harvester 12. The straps 22 of the second 16 and third 18 points of attachment are placed into connection with both the device 10 and the harvester 12 by any suitable means including, but not limited to, the use of bolts through bolt holes at respective ends of the straps 22.

The harvester 12 may be used normally in the manner in which it is intended or any other way as is desired by the user. Accordingly, the harvester 12 cuts and processes crops, for example, wheat, so that the useable wheat seeds are delivered to a storage bin for transport and use, and waste material from the harvesting process, such as straw 68 and chaff 70, are disposed of on the harvested land. The normal operation of the harvester 12 separates the two waste fractions 68, 70 using weight differences, with the lighter straw 68 being blown along a higher path through the harvester than the chaff 70.

The plate 54 of the device 10 acts to continue the separation of the waste fractions 68, 70 after their transport through the harvester 12. The longer straw 68 is continued to be separated from the chaff by the plate 54 positioned to direct the straw 68 from the harvester 12 to the straw chute 48. The straw 68 moves from the harvester 12 along the plate 54 to the open upper end of the straw chute 48. As the straw 68 falls through the straw chute 48 under the effects of gravity, the tapered side walls 52 of the straw chute 48 direct the straw 68 to form a relatively narrow windrow along the harvested land from the open lower end of the straw chute 48.

Meanwhile, the finer chaff 70 is discharged from the harvester 12, from its usual exit point, into the trough 24. The front guard 62 and optional front flap assist in guiding the chaff 70 into the trough 24 and prevent it from falling forward of the trough 24. The plate 54 positioned above the trough 24 and the rear guard also assist in guiding the chaff 70 into the trough 24 and prevent it from falling through the central hole of the annular trough 24. The optional side guards 72, if fitted to the device 10, also assist in directing the chaff 70 into the trough 24 at respective left and right sides of the device 10.

The hydraulic pump 32 is placed into powered connection with the harvester 12 so as to be operable. The pump 32 drives the cog 30, the teeth of which grip links of the chain 26. As would be understood, the driven cog 30 causes the chain 26, and paddles 28 provided thereon, to rotate through the trough 24.

Once caught within the trough 24, the chaff 70 is moved through the trough 24 by the moving paddles 28. As the chain 26 and paddles 28 move in a singular direction, the chaff 70 is caused to move from the forward unroofed portion of the trough 24 back towards the rear roofed portion of the trough 24. In time, the chaff 70 reaches the rear centre of trough 24 and is caused to fall through the chaff vent 46. As the chaff vent 46 is aligned with the straw chute 48, the chaff 70 would fall on top of the previously deposited straw 68 windrow. Accordingly, the windrows can be baled in the normal manner and the chaff 70, including weed seeds is ensured to be collected in the bales and removed from the harvested land, thereby decreasing viable weeds in the land. Otherwise, the windrows may be burnt; due to the chaff 70 sitting above the straw 68, the chaff 70 is exposed to adequate temperatures to destroy weed seeds, rather than being insulated from the fire by the straw 68 were the chaff 70 situated below the straw 68.

Other embodiment weed seed management devices 10 are also contemplated in accordance with the present invention. For instance, the aforementioned means for moving chaff 70 through the trough 24 may, instead of being provided as a chain 26 and paddles 28, be any means suited to the relevant function of moving chaff 70 through the trough 24. These means may include, for example, a spiral conveyer such as an auger, a conveyer belt, air blowing, vacuum means, or using an electrical charge. Likewise, the points of attachment 14, 16, 18 may be provided as any suitable attachment means, for example welding, providing a means for secure attachment of the device 10 to the harvester 12. Further, the construction materials herein described are preferable materials and other materials suited to construction of particular integers may also be used. For example, the aforementioned plastic guards 62, 72 and rear guard may be constructed of metal or fabric, for example, or any other material suited to directing material from the harvester 12 along its desired path. The drive cog 30 has been described as being driven by a hydraulic pump 32, which is generally the source of power for the device 10. However, any power source suitable for operating the device 10, may substitute the hydraulic pump 32.

Modifications and variations as would be apparent to a skilled addressee are deemed to be within the scope of the present invention.

The invention claimed is:

1. A mechanical weed seed management device for use on a harvester, the device comprising:
   a plate to separate straw waste from chaff waste after their discharge from the harvester;
   a chute to catch, direct, and deposit the straw waste to the ground; and
   an annular trough comprising a means for transporting material through its length, for catching, transporting, and depositing the chaff waste on top of the straw waste on the ground, wherein the trough is of a depth greater than 150 mm, and wherein the plate directs the straw waste from the harvester to the chute.

2. The device according to claim 1, wherein the trough is of a depth of 310 mm.

3. The device according to claim 1, wherein the trough is of a width of between 250 mm and 450 mm.

4. The device according to claim 3, wherein the trough is of a width of between 275 mm and 290 mm.

5. The device according to claim 1, wherein the trough is generally triangular with rounded corners in shape.

6. The device according to claim 1, further comprising at least one guard abutting a section of the trough for assisting in guiding the chaff waste into the trough.

7. The device according to claim 6, wherein the at least one guard is disposed at one or more of: forward of the trough; within a middle area of the trough, forward of the chute; and above an unroofed length of the trough, at respective sides of the device.

8. The device according to claim 1, wherein the chute is tapered inwardly downwards for directing the straw into a narrower deposit.

9. The device according to claim 1, wherein the width of the chute is variable for a variable width deposit of straw waste on the ground.

10. The device according to claim 1, wherein the trough is square shaped in sectional profile.

11. The device according to claim 1, wherein the means for transporting material through the length of the trough comprises a paddled chain.

12. The device according to claim 11, wherein each paddle is dimensioned so as to be of a complementary size and shape to the trough.

13. The device according to claim 1, wherein the device is powered by a hydraulic pump.

14. The device according to claim 1, further comprising a monitoring means for monitoring operation of the device and/or alerting a user if the operation is interrupted.

\* \* \* \* \*